United States Patent
Arunarthi

(10) Patent No.: US 9,893,838 B2
(45) Date of Patent: Feb. 13, 2018

(54) SYSTEM AND METHOD FOR IMPLEMENTING MULTIPLE FEC ENCODING PROFILES

(71) Applicant: CORTINA SYSTEMS, INC., Sunnyvale, CA (US)

(72) Inventor: Venkat Arunarthi, San Jose, CA (US)

(73) Assignee: REALTEK SINGAPORE PTE LTD, Singapore (SG)

( * ) Notice: Subject to any disclaimer, the term of this patent is extended or adjusted under 35 U.S.C. 154(b) by 36 days.

(21) Appl. No.: 14/135,507

(22) Filed: Dec. 19, 2013

(65) Prior Publication Data

US 2014/0181616 A1    Jun. 26, 2014

Related U.S. Application Data

(60) Provisional application No. 61/745,107, filed on Dec. 21, 2012.

(51) Int. Cl.
| | |
|---|---|
| H03M 13/00 | (2006.01) |
| H04L 1/00 | (2006.01) |
| H04B 10/272 | (2013.01) |
| H04L 7/00 | (2006.01) |
| H04L 7/033 | (2006.01) |
| H04Q 11/00 | (2006.01) |

(52) U.S. Cl.
CPC ......... H04L 1/0025 (2013.01); H04B 10/272 (2013.01); H04L 1/0009 (2013.01); H04L 7/0037 (2013.01); H04L 7/0041 (2013.01); H04L 7/0337 (2013.01); H04Q 11/0067 (2013.01)

(58) Field of Classification Search
CPC ... H04B 10/272; H04L 7/0041; H04L 7/0337; H04L 1/0009; H04L 1/0025; H04L 7/0037; H04Q 11/0067
See application file for complete search history.

(56) References Cited

U.S. PATENT DOCUMENTS

| | | | |
|---|---|---|---|
| 2005/0149822 A1* | 7/2005 | Lee et al. | 714/758 |
| 2006/0182132 A1 | 8/2006 | Kim et al. | |
| 2007/0256001 A1* | 11/2007 | Suzuki et al. | 714/774 |
| 2010/0061725 A1 | 3/2010 | Jiang | |
| 2010/0185918 A1 | 7/2010 | Ashkenazi et al. | |
| 2010/0215369 A1* | 8/2010 | Effenberger et al. | 398/67 |
| 2010/0316381 A1* | 12/2010 | de Lind van Wijngaarden | H04J 3/1694 398/58 |

(Continued)

OTHER PUBLICATIONS

International Search Report for PCT Patent Application No. US2013/076744 dated May 23, 2014, 27 pages.
David Li, Hisense-Ligent; "Current Status of the 10G-EPON Power Budget and Improvement", Sep. 2011, 15 pgs.

(Continued)

*Primary Examiner* — Guy Lamarre
(74) *Attorney, Agent, or Firm* — McClure, Qualey & Rodack, LLP

(57) ABSTRACT

Systems and methods for FEC encoding, for example for 10GEPON are provided. For the upstream or downstream, multiple FEC encoding and decoding profiles are implemented that include various levels of FEC encoding. Then, for a given ONU, a selection between these FEC encoding profiles is made. The OLT can instruct the ONU which FEC encoding profile to use for upstream, and which FEC decoding profile to use for downstream.

19 Claims, 14 Drawing Sheets

(56) References Cited

U.S. PATENT DOCUMENTS

2012/0087649 A1    4/2012    Zhang et al.

OTHER PUBLICATIONS

IEEE Std 802.3-2012 (Revision of IEEE Std 802.3-2008); IEEE Standard for Ethernet; LAN/MAN Standards Committee of the IEEE Computer Society, approved Aug. 30, 2012, 684 pgs (Section 1).

IEEE Std 802.3-2012 (Revision of IEEE Std 802.3-2008); IEEE Standard for Ethernet; LAN/MAN Standards Committee of the IEEE Computer Society, approved Aug. 30, 2012, 780 pgs (Section 2).

IEEE Std 802.3-2012 (Revision of IEEE Std 802.3-2008); IEEE Standard for Ethernet; LAN/MAN Standards Committee of the IEEE Computer Society, approved Aug. 30, 2012, 358 pgs (Section 3).

IEEE Std 802.3-2012 (Revision of IEEE Std 802.3-2008); IEEE Standard for Ethernet; LAN/MAN Standards Committee of the IEEE Computer Society, approved Aug. 30, 2012, 732 pgs (Section 4).

IEEE Std 802.3-2012 (Revision of IEEE Std 802.3-2008); IEEE Standard for Ethernet; LAN/MAN Standards Committee of the IEEE Computer Society, approved Aug. 30, 2012, 844 pgs (Section 5).

IEEE Std 802.3-2012 (Revision of IEEE Std 802.3-2008); IEEE Standard for Ethernet; LAN/MAN Standards Committee of the IEEE Computer Society, approved Aug. 30, 2012, 400 pgs (Section 6).

\* cited by examiner

SYSTEM AND METHOD FOR IMPLEMENTING MULTIPLE FEC ENCODING PROFILES

This application claims the benefit of U.S. Provisional Application No. 61/745,107 filed Dec. 21, 2012 and entitled "SYSTEM AND METHOD FOR IMPLEMENTING MULTIPLE FEC ENCODING PROFILES", the entirety of which is incorporated herein by reference.

FIELD

The application relates to systems and methods for implementing multiple FEC (forward error correction) encoding profiles.

BACKGROUND

IEEE Std. 802.3av specifies stream based FEC for 10GEPON as mandatory. The FEC (forward error correction) specified in IEEE Std. 802.3av for 10GEPON uses an RS (Reed Solomon) (255,223) code.

BRIEF DESCRIPTION OF THE DRAWINGS

Embodiments of the disclosure will now be described with reference to the attached drawings in which.

DETAILED DESCRIPTION

The FEC (forward error correction) specified in IEEE Std. 802.3av for 10G EPON uses an RS (Reed Solomon) (255, 223) code which reduces the effective link bandwidth by approximately 13%.

In an example, when certain conditions exist, FEC encoding is turned off, or an FEC encoding with reduced parity is used for upstream and/or downstream transmissions between an OLT and an ONU. This frees up bandwidth that would otherwise have been used for FEC encoding. A different decision regarding FEC encoding can be made for each ONU such that on a burstwise basis, each burst is either FEC encoded, or not (or has reduced FEC encoding). The OLT instructs each ONU whether to use FEC encoding or not for upstream transmission, and instructs each ONU whether to expect FEC encoding or not for downstream transmission. Optionally, burst delimiters, or other fields in each burst, are used to convey whether FEC encoding is used, or not, for each burst.

Figure 1:
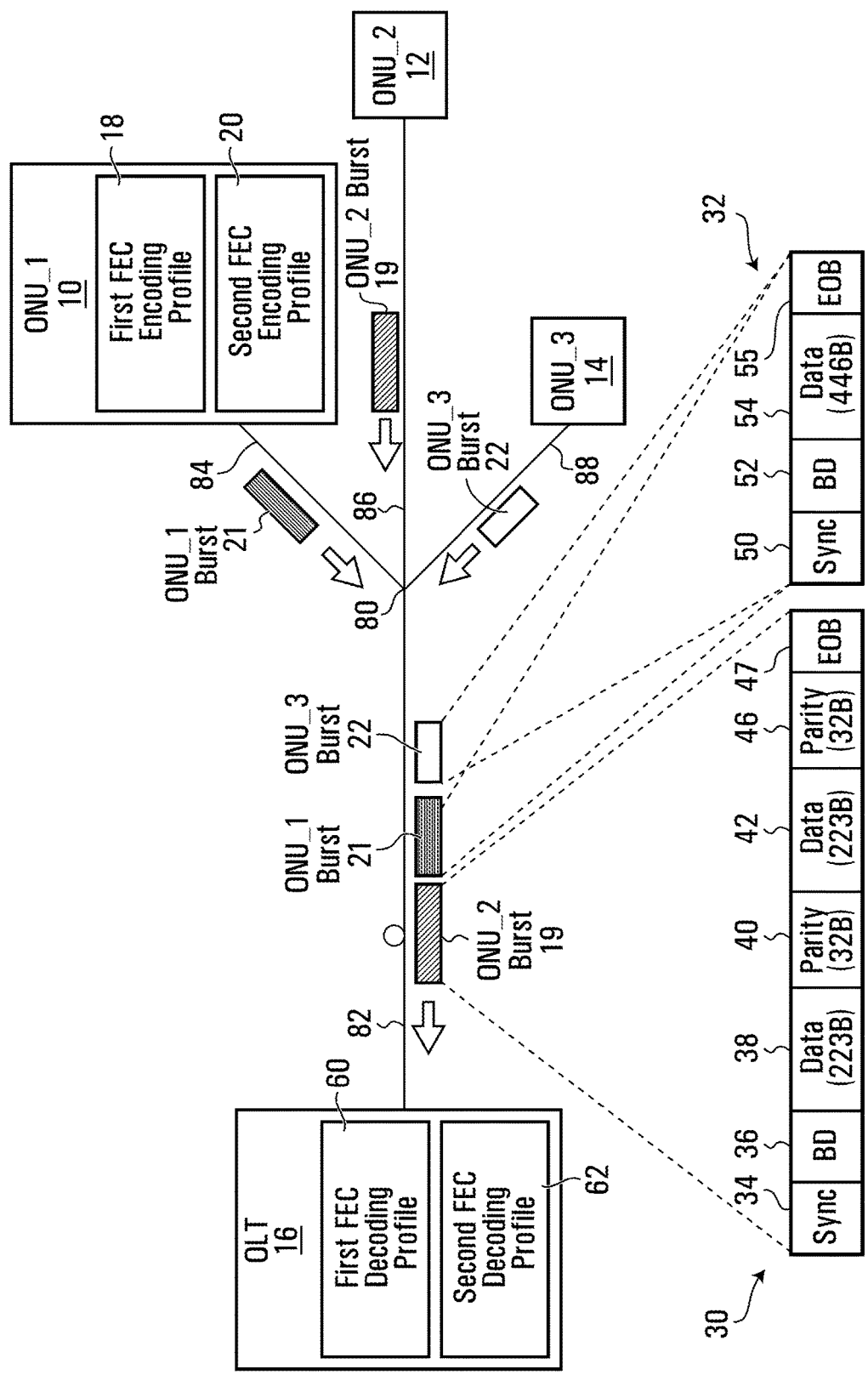
FIG. 1 is a block diagram of a system that implements multiple FEC encoding profiles for upstream burst transmission.

FIG. 1 depicts a system block diagram of a passive optical network that implements multiple FEC encoding profiles. Shown are three optical network units (ONUs) ONU_1 10, ONU_2 12 and ONU_3 14 that are connected in an upstream direction to an optical line terminal (OLT) 16. ONUs 10, 12 and 14 are shown connected to a passive optical splitter 80 through respective branch fibers 84,86,88, and passive optical splitter 80 is connected to the OLT 16 through trunk fiber 82.

An ONU is a generic term denoting a device that terminates any one of the endpoints of a fiber to the premises network. An ONU can implement a passive optical network (PON) protocol, and adapt PON protocol data units to subscriber service interfaces. In some contexts, an ONU implies a multiple subscriber device. An optical network terminal (ONT) is a special case of an ONU that can serve a single subscriber.

An OLT is a device which serves as the service provider endpoint of a passive optical network. It provides two main functions:
1. to perform conversion between the electrical signals used by the service provider's equipment and the fiber optic signals used by the passive optical network.
2. to coordinate the multiplexing between the optical network units on the other end of that network.

The ONUs 10,12,14 are generally similar in terms of their ability to implement different FEC profiles as described herein, and the details of ONU 10 will be described by way of example. ONU_1 10 is configured to implement a first FEC encoding profile 18, and a second FEC encoding profile 20. There may be other components in ONU 10 that are not shown in the interest of brevity.

The difference between the two encoding profiles 18 and 20 is that the first FEC encoding profile includes FEC encoding, whereas the second encoding profile 20 either does not include FEC encoding, or includes FEC encoding with weaker coding than the FEC encoding of the first encoding profile 18. There may be additional FEC encoding profiles. For example, a set of three or more FEC encoding profiles might be provided in which one is a full strength FEC encoding, one or more FEC encoding profiles are reduced strength FEC encoding profiles, and another FEC encoding profile has no FEC encoding.

In some embodiments, the implementation of the multiple FEC encoding profiles in each ONU is achieved through the use of a configurable FEC encoder that can be reconfigured to transmit using a selected FEC encoding profile. Such a reconfigurable FEC encoder can be bypassed for a case where no encoding is performed for one of the FEC encoding profiles.

In some embodiments, a respective FEC encoder is implemented for each FEC encoding profile that includes FEC encoding, and bursts are directed to the appropriate FEC encoder for processing. For an FEC encoding profile with no encoding, a bypass is provided. The FEC encoding profiles may include delay elements to align the timing of the processing that takes place in the various profiles, generally to keep data path delay constant.

Similarly, the OLT 16 is shown to include a first FEC decoding profile 60 and a second FEC decoding profile 62. The two decoding profiles 60,62 differ in that the first FEC decoding profile corresponds to the first FEC encoding profile 18, and the second FEC decoding profile corresponds to the second FEC encoding profile 20. The comments above on the implementation of the FEC encoding profiles apply as well to the implementation of the FEC decoding profiles.

Now an example of the functioning of the passive optical network of FIG. 1 will be described by way of example. For this example, it is assumed that the first FEC encoding profile includes FEC encoding, and the second FEC encoding profile does not include any FEC encoding. To begin, two different burst formats are defined. A first burst type defined for the first FEC encoding profile is indicated at 30 and with this format, data is FEC encoded and as such, the burst includes parity. The burst 30 includes a sync field 34, FEC encoding information in the form of a burst delimiter (BD) field 36, a data field 38, a parity field 40, another data field 42, another parity field 46, and end of burst (EOB) 47. More generally, there may be any number of data and parity fields. The particular format of the burst is consistent with the RS(223, 255) encoding that 10GEPON uses per IEEE Std. 802.3av, but it should be understood that more generally, for the purpose of this embodiment, all that is necessary is FEC encoding information, data and parity. A second burst type defined for a second FEC encoding profile is indicated at 32. This burst includes a sync field, FEC encoding information in the form of a BD field 52, a data field 54, and EOB field 55. For this example, the data field 54 is a multiple of 223 bytes. More generally, for an FEC encoding profile that does not include FEC encoding, the burst 32 can be defined with any fields so long as there is FEC encoding information and a data field and no parity field for the data.

For both burst types, the data is an integral multiple of 223 bytes. In some embodiments, another different multiple is used.

In some embodiments, where an integral multiple is used, the last portion of actual data that the transmitter transmits is less than the integral multiple (e.g. 223 bytes), so the last portion contains whatever data that is remaining, however, there would still be the normal amount of parity (e.g., 32 bytes). In such a case, the FEC encoder adds imaginary bytes (to make up the block size), computes the parity, but discards (does not transmit) the imaginary bytes.

The burst delimiter field included in the two burst types 30, 32 is a specific example of FEC encoding information. Each ONU uses different FEC encoding information, for example different BD values, to indicate which FEC encoding profile is being used. The definition of each FEC encoding profile is understood by both parties. For example, the definitions and associated BD values may be installed at each ONU at initial configuration. They may be configured by the OLT after a new ONU is discovered. This may occur via higher layer protocols such as OAM (operations, administration and maintenance), eOAM (extended OAM) or MAC (medium access control) that are available in EPON (Ethernet Passive Optical Network), or alternatively it can be part of the boot code at each ONU. The following is a specific example of two FEC encoding profiles that might be configured using one of these mechanisms:

BD_profile_A corresponds to RS (223, 255)—223 data bytes, 32 parity bytes in every 255 byte block. This has roughly 13% overhead and can correct up to 16 bytes.

BD_profile_B corresponds to RS (239, 255)—239 data bytes, 16 parity bytes in every 255 byte block. This coding can correct for up to 8 bytes but only has half the overhead.

It is also possible to use an FEC coding that has even lower overhead for reduced protection depending on the link condition (error rate), distance of ONU from OLT and optical link budgets/quality of the optical transceivers.

In some embodiments, the BD field is a 66 bit unsigned value. A different BD value is defined for each FEC encoding profile. More generally, where BDs are employed, any burst delimiter definition may be used so long as there is enough hamming distance between the different burst delimiter values such that one is not mistaken for others in the presence of errors as the BD field itself is not FEC protected.

The OLT may instruct the ONU to use a particular FEC encoding profile. The FEC encoding profile applied to each burst can be selected depending on various parameters such as distance to the ONU, optics qualify, operator's choice, desired BER etc. In some embodiments, the OLT monitors upstream performance from each ONU, for example by monitoring bit error rate, and uses this information to determine which FEC encoding profile to use. For example, when BER is above a threshold, a first FEC encoding profile is used, and when BER is below the threshold, a second FEC encoding profile is used.

The OLT may instruct the ONU to use a particular FEC encoding profile, for example, by sending eOAM or MAC Control message. After an ONU processes the command, the ONU switches to the new profile requested by the OLT. In some embodiments, the chosen profile is reflected by FEC encoding information transmitted in band, i.e. as part of each burst (e.g. BD), so that the OLT knows that the FEC encoding profile requested by the OLT is being used, and so that the OLT knows to use the appropriate FEC decoding profile. The inclusion of FEC encoding information in band makes switching easier but it is also possible to use higher level control messages without in band notification. Examples of this are provided below.

The following is a specific example of a method of changing the upstream FEC encoding profile:

1. OLT sends upstream profile change command (for example eOAM or MAC Control message) to ONU;
2. OLT stops upstream grants for some time, allowing ONU to process the command;
3. OLT resumes upstream grants and assumes next burst from ONU is encoded using new profile and uses appropriate decoding parameters.

The OLT decodes the BD and applies the correct FEC decoding profile to its FEC decoder, either by using a different decoder engine or by configuring the same engine with a different profile depending on the implementation.

At the specific instance depicted, ONU_1 10 is configured to use the second FEC encoding profile and as such it generates a burst 21 that has the burst format of example burst 32. ONU_2 12 is configured to use the first FEC encoding profile 18, and as such it generates a burst 19 that is consistent with the format of burst 30. Finally, ONU_3 14 is configured to use the second FEC encoding profile 20, and as such it generates a burst 22 having a format consistent with burst 32. These three bursts are transmitted by the respective ONUs, with a timing that is set by the network so that the bursts, when combined at passive optical splitter 80, do not interfere. Now the bursts are depicted upstream of passive optical splitter 80 on trunk fiber 82.

The bursts transmitted by ONU_1 10 and ONU_3 14 include a first burst delimiter 52 that indicates that the burst was transmitted using a second FEC encoding profile (e.g. for which there is no FEC encoding). The burst transmitted by ONU_2 12 includes a second burst delimiter field 36 that indicates that the burst was transmitted using a first FEC encoding profile (e.g. one that includes FEC encoding).

Later, the OLT 16 receives the bursts. It examines the burst delimiter field (or other FEC encoding information) of each burst and processes the burst with the appropriate FEC decoding profile. As such, burst 19 is processed with the first FEC decoding profile 60, while bursts 21 and 22 are processed with the second FEC decoding profile 62.

Note that a precursor to the scenario to FIG. 1 is signaling transmitted to the ONUs 10,12,14 that instructs the ONUs when to transmit their bursts. This ensures that the bursts are transmitted so as to be non-interfering when combined at passive optical splitter 80. The signaling may, for example, be in the form of a grant. This may, for example, be in the form of a start time and a length of time for transmission. In some embodiments, the ONU reports how much data it has, and how much data it has for each of various priorities. Then, the OLT decides how much capacity to grant each ONU.

Figure 2:
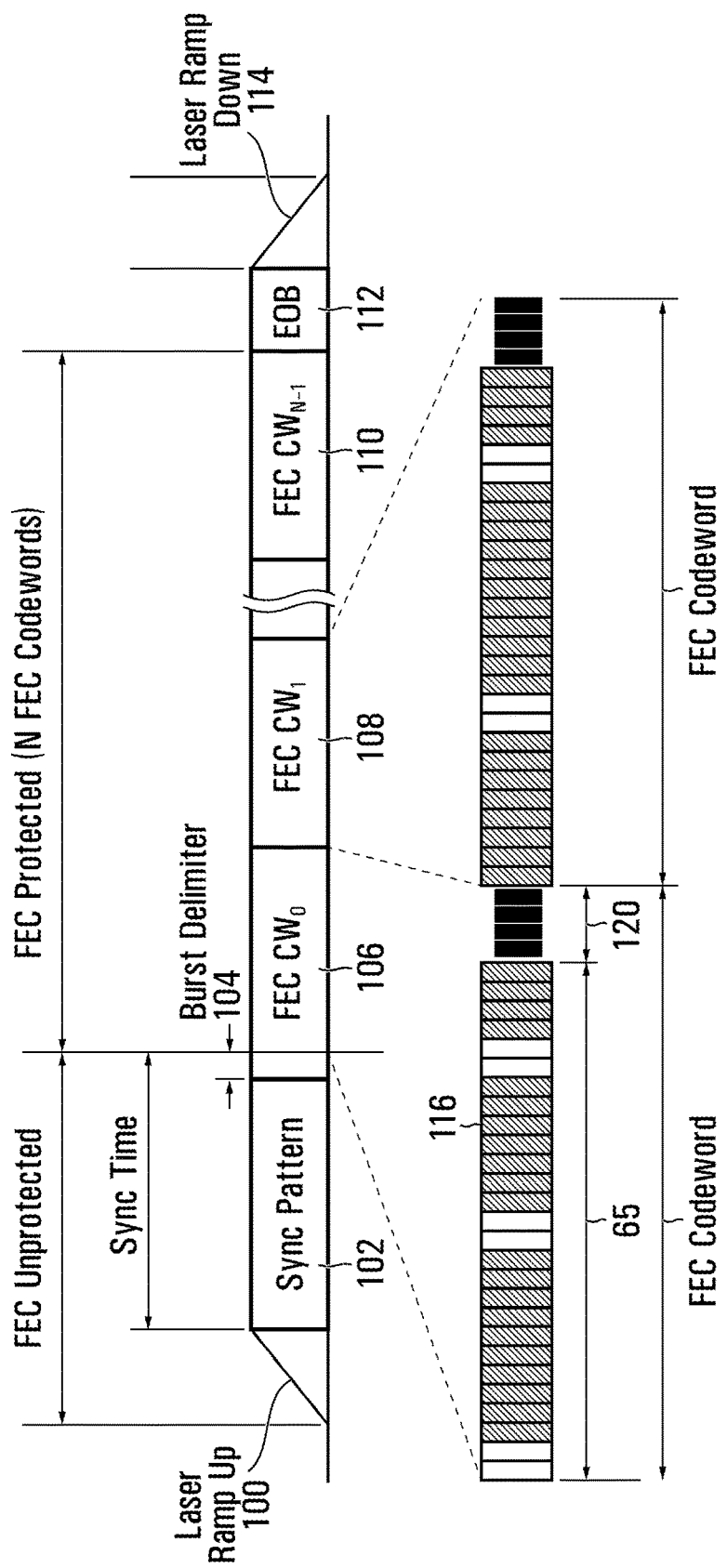
FIG. 2 depicts an example of a burst containing FEC protected codewords.

FIG. 2 is a detailed example of an upstream burst with FEC. Shown is a laser ramp up period 100. This is followed by a sync pattern 102 and a 66 bit burst delimiter block 104. This is followed by FEC protected codewords 106, 108 . . . , 110. This is followed by an end of burst 112 and a laser ramp down 114. The contents of FEC codewords 106,108 are expanded in FIG. 2 by way of example, and the contents of codeword 106 will be described in detail. Section 65 of codeword 106 is shown to include twenty seven 66 bit blocks 116. These include idle blocks (shown unshaded) and MAC data blocks (shown with shading). Following this is a parity section 120 containing four 66 bit parity blocks. In the illustrated example, the first codeword starts with two 66 bit blocks containing idle. Sections 100,102,104, 112,114 of the codeword are FEC unprotected, whereas the FEC protected codewords 106,108, . . . , 110 are FEC protected.

Figure 3:
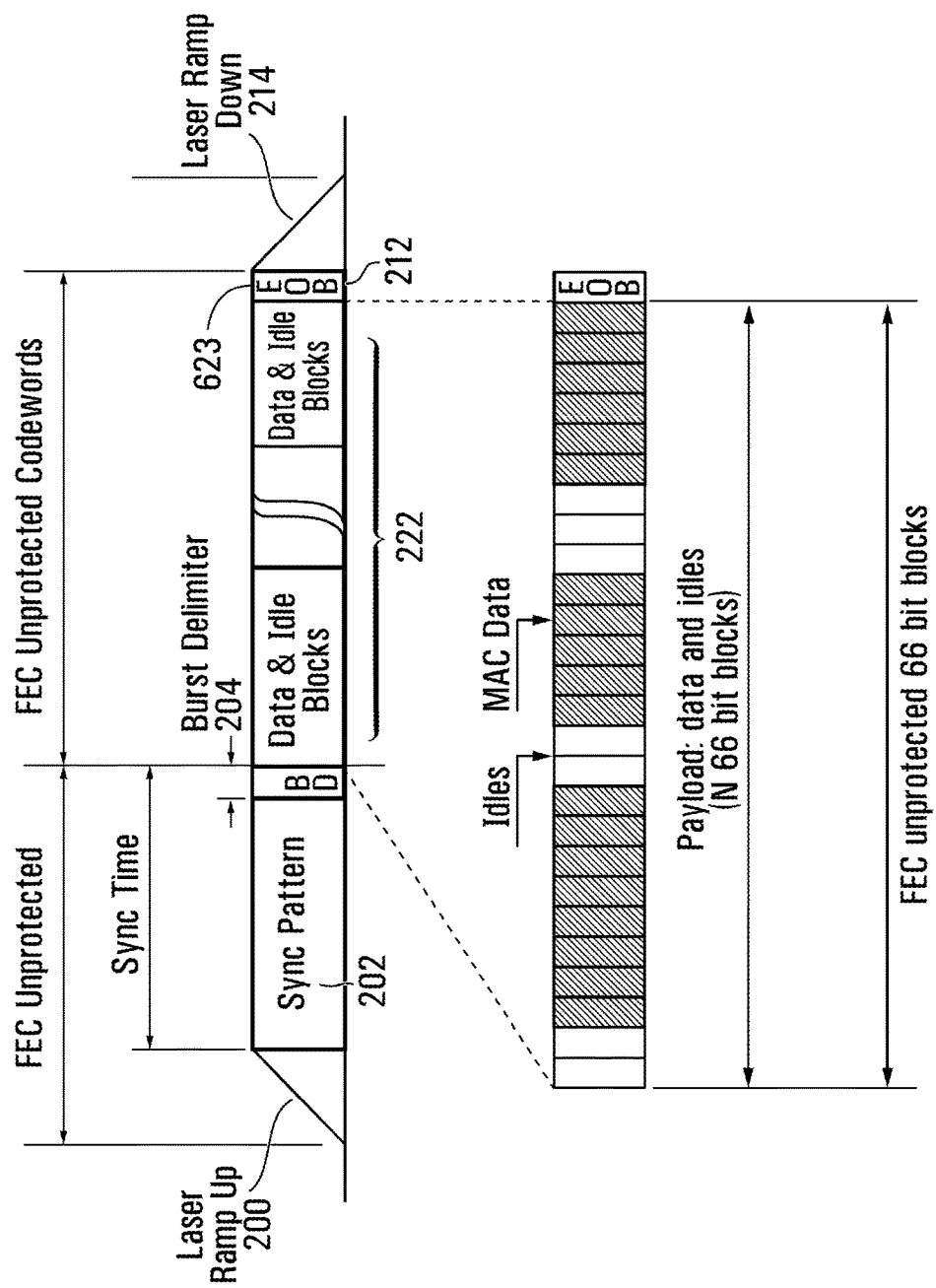
FIG. 3 depicts an example of an upstream burst containing FEC unprotected codewords.

Referring now to FIG. 3, shown is an example of an upstream burst with no FEC encoding. Shown is a laser ramp up 200. This is followed by a sync pattern 202 and a 66 bit burst delimiter block. This is followed by a payload 222 and end of burst 212 followed by laser ramp down 214. The payload 222 in this example is shown to include N 66 bit blocks, but more generally, the payload can be organized in an implementation specific manner. In the example, the payload includes 27 66 bit blocks, and this is consistent with the amount of data in the payload of a RS (223, 255) codeword specified in IEEE Std. 802.3av, but more generally, any number of blocks may be present; the size of the blocks is also implementation specific. The data blocks include idle and MAC data blocks.

Figure 4A:
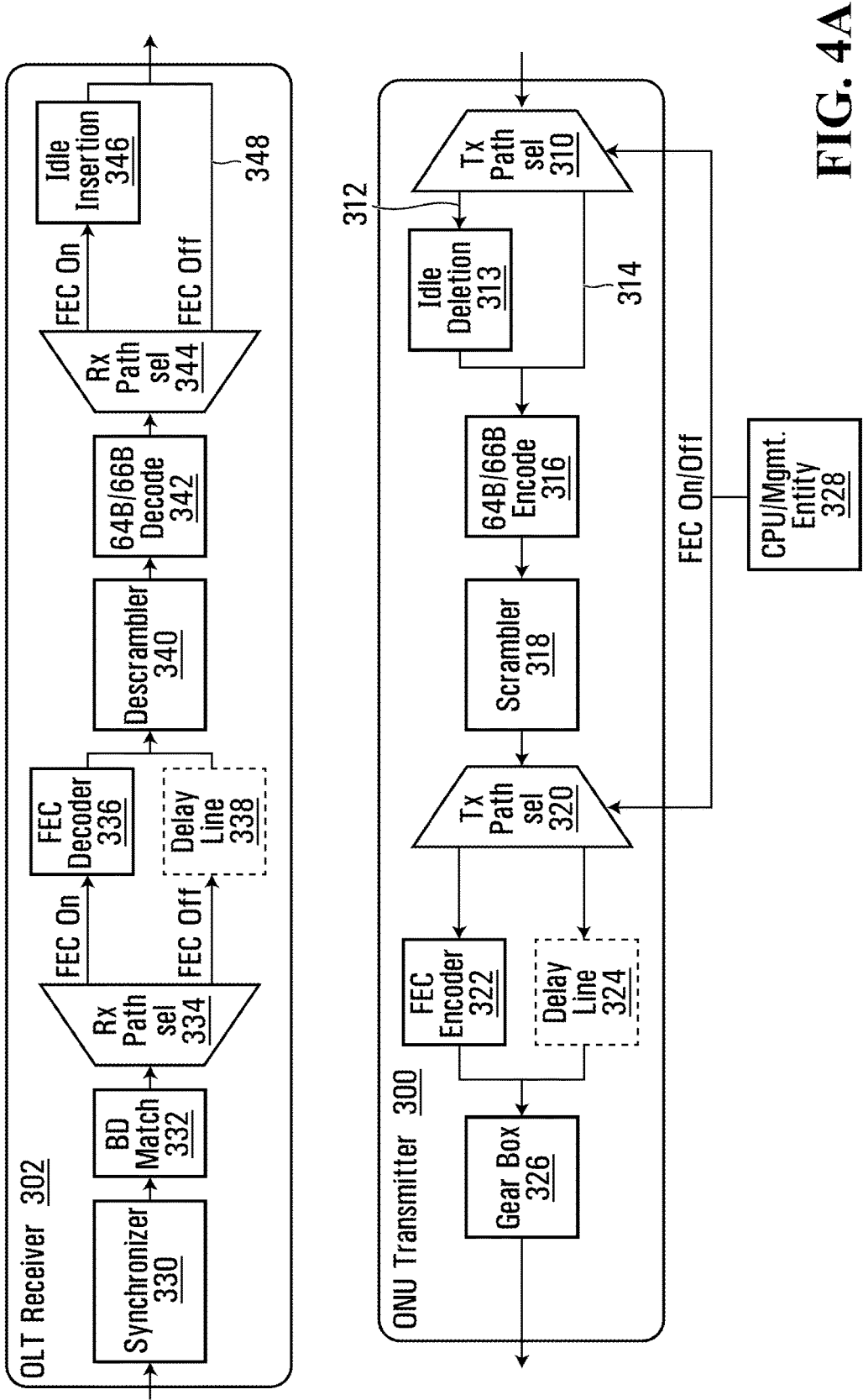
FIG. 4A is a block diagram of a detailed receiver and transmitter implementation for upstream burst transmission with differing FEC profiles with in-band FEC encoding information transmission.

Referring now to FIG. 4A, shown is a block diagram of a system that implements upstream burst transmission with alternative FEC encoding profiles. FIG. 4A is a very specific example in which two encoding/decoding profiles are provided that include one with FEC encoding/decoding and one without. The system includes an ONU transmitter 300 and an OLT receiver 302. The transmitter 302 includes a CPU/Management entity 328 that controls whether FEC is on or off for a given burst. More generally, management entity 328, when present, may be part of the ONU, OLT or another remote network element such as NMS (network management system. The CPU/Management entity 328 controls path selection in transmit path selectors 310 and 320. In path selector 310, path 312 is selected when the first FEC encoding profile is active; for this example, this means FEC encoding is to take place, and path 314 is selected when the second FEC encoding profile is active; for this example, this means that FEC encoding is not to take place. Path 312 includes an idle deletion block 313. Following this, a 64 B/66 B encoding is performed at 316 followed by scrambling at 318. Then, transmit path selector 320 passes the output of scrambler 318 to FEC encoder 322 if the first FEC encoding profile is active, or to delay line 324 if the second FEC encoding profile is active. The paths then merge again and input to gear box 326 which performs a data width conversion function and generates an output of the ONU transmitter 300. The idle deletion block 313 deletes idle blocks from an incoming block stream. In a specific implementation, the MAC layer (not shown) supplies Ethernet frames to the PHY layer one by one and there is some gap (IPG/IFG—inter packet gap OR inter frame gap) between every two frames. For a FEC encoding profile that includes FEC encoding, the PHY layer adds FEC parity blocks to the data. For example, it might add 32 bytes of parity for every 223 bytes of data. The MAC layer introduces IPG by sending down IDLE 66 B blocks. The PHY layer deletes the IDLE codewords and uses that time to transmit locally created FEC parity bytes instead. The MAC layer is also made aware of the encoding profile being applied to a given burst, and can insert the appropriate number of idles to make room for the amount of parity specified by the encoding profile. The number of idles inserted by the MAC layer, and the number of idles deleted by idle deletion 313 depends on the REC encoding profile and more specifically on the number of parity bytes. The MAC layer does not need to insert idles if there is no FEC encoding. In this case, path 314 is taken, such that idle deletion is not performed in the PHY layer.

The delay line 324 introduces a delay in the output of scrambler 318 such that the FEC encoded output or the non-FEC encoded output arrive at the input of the gear box 326 with the same timing.

The ONU transmitter 300 transmits in accordance with a schedule dictated by the OLT. The ONU 300 uses the FEC encoding profile in accordance with instructions from the network. The ONU includes a burst delimiter in each burst that indicates which FEC encoding profile was used.

Turning now to the receiver 302, this includes a synchronizer 330 the output of which is input to a BD match block 332. The BD match block 332 determines which FEC encoding profile was used for the given burst, accordingly indicates which FEC decoding profile to use in the receiver. The output is then passed to the receive path selector 334. If the burst delimiter indicates the first FEC decoding profile is to be used, then the output is passed to FEC decoder 336 whereas if the burst delimiter indicates that the second FEC decoding profile is to be used, then the output is passed to delay line 338. The output of blocks 336 and 338 is passed to the input of descrambler 340. The output of descrambler 340 is passed to the 64 B/66 B decoder 342. Decoder 342 is connected to another receive path selector 344. If the first FEC decoding profile is active, the output is passed to idle insertion block 346 whereas if the second FEC decoding profile is active, the output is passed via path 348 directly to the output.

The purpose of delay line 338 is such that the output of blocks 336 and 338 takes place with the same timing independent of which of these two blocks is selected. In a specific implementation, the purpose of the idle insertion block 346 parallels that of the idle deletion block 313 discussed above. Because the PHY layer consumes FEC parity bytes, it needs to transmit something in its place to the MAC layer, so it transmits idle blocks.

Similar functionality to that of FIG. 4A can be used to implement a system featuring two or more different FEC encoders. In the illustrated example, path selectors are used to convey bits to the appropriate encoder/decoder. Alternatively, rather than having distinct paths selected by path selectors, reconfigurable FEC encoders/decoders can be used with inputs that select which FEC encoding/decoding profile to use in which case path selectors are not necessary. Furthermore, the example of FIG. 4A can be expanded to include additional FEC encoding/decoding profiles.

Figure 4B:
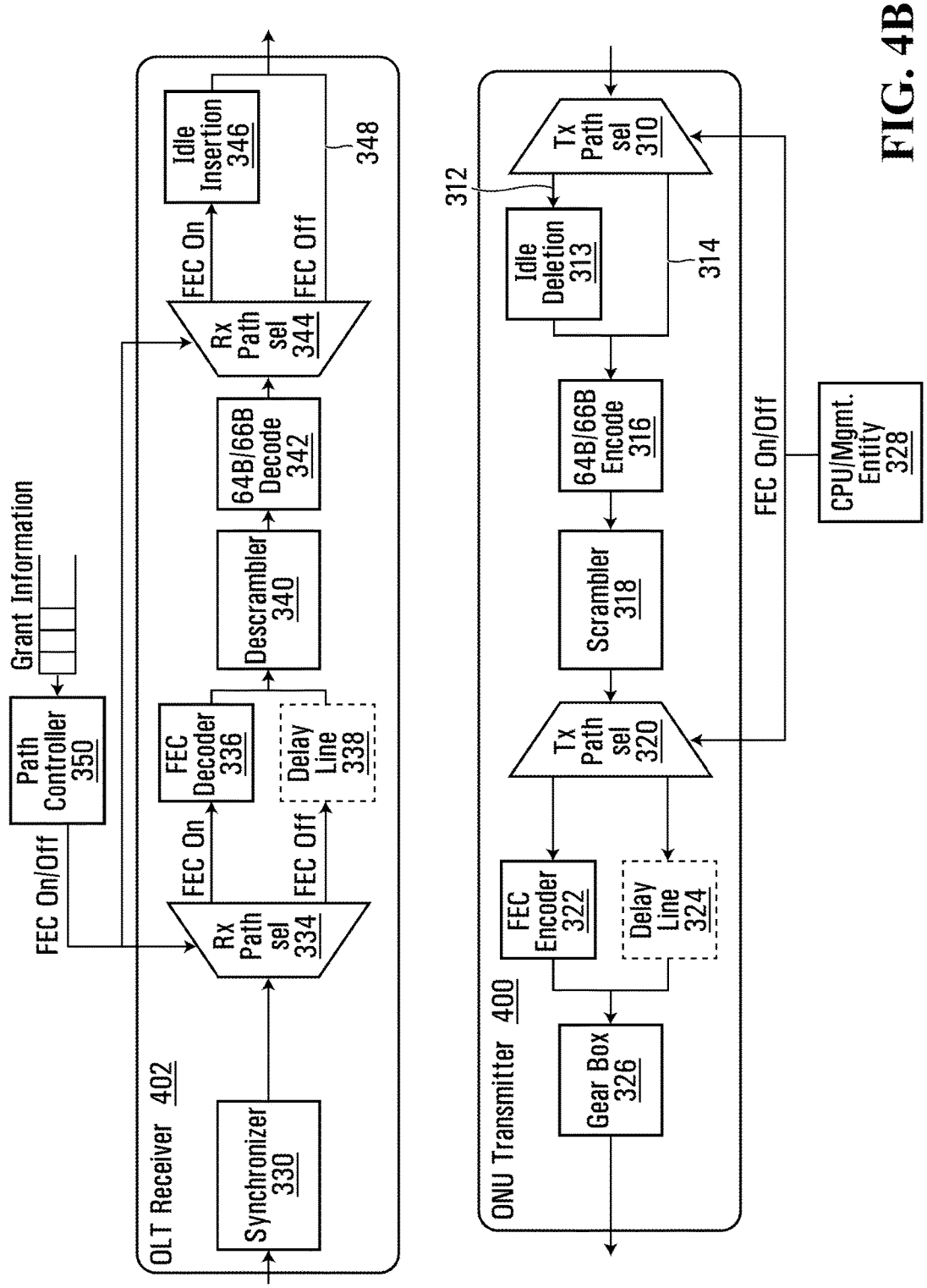
FIG. 4B is a block diagram of a detailed receiver and transmitter implementation for upstream burst transmission with differing FEC profiles with in-band FEC encoding information transmission.

Referring now to FIG. 4B, shown is another example of an ONU transmitter 400 and an OLT receiver 402. The ONU transmitter 400 is the same as ONU transmitter 300 of FIG. 4A with the exception of the fact that the burst generated by the ONU transmitter does not contain a burst delimiter that distinguishes between FEC decoding profiles. Thus, all bursts may for example contain the same burst delimiter. In a specific example, this may be the same as the burst delimiter specified in IEEE Std. 802.3av. The OLT receiver 402 differs from OLT receiver 302 of FIG. 4A in that there is no BD match block 332. In addition, receive path selection in receive path selectors 334 and 346 is controlled by the output of a path controller 350. Path controller 350 may, for example, be implemented as part of an MPCP (multi-point control protocol) engine. The path controller 350 generates FEC on/off controls for the selectors 334,344 as a function of grant information.

The ONU transmitter 400 transmits in accordance with a schedule dictated by the network. The ONU 400 uses the FEC encoding profile in accordance with instructions from the network. The ONU does not transmit a burst delimiter in each burst that indicates which FEC encoding profile was used. At the OLT receiver 402, the grant information input to the path controller 350 allows the path controller 350 to generate FEC On/Off signals (more generally FEC profile selection signals) that control the selection of the appropriate FEC decoding profile in the receiver to match that used in the ONU. In a specific example, communications from each ONU are associated with an LLID (logical link identifier). The OLT transmitter 300 is aware of which encoding profile is to be used in each ONU, and the grant information indicates when a burst from each ONU is expected to arrive at the OLT. These two pieces of information together allow a determination of when each FEC decoding profile should be activated in the receiver.

Figure 5:
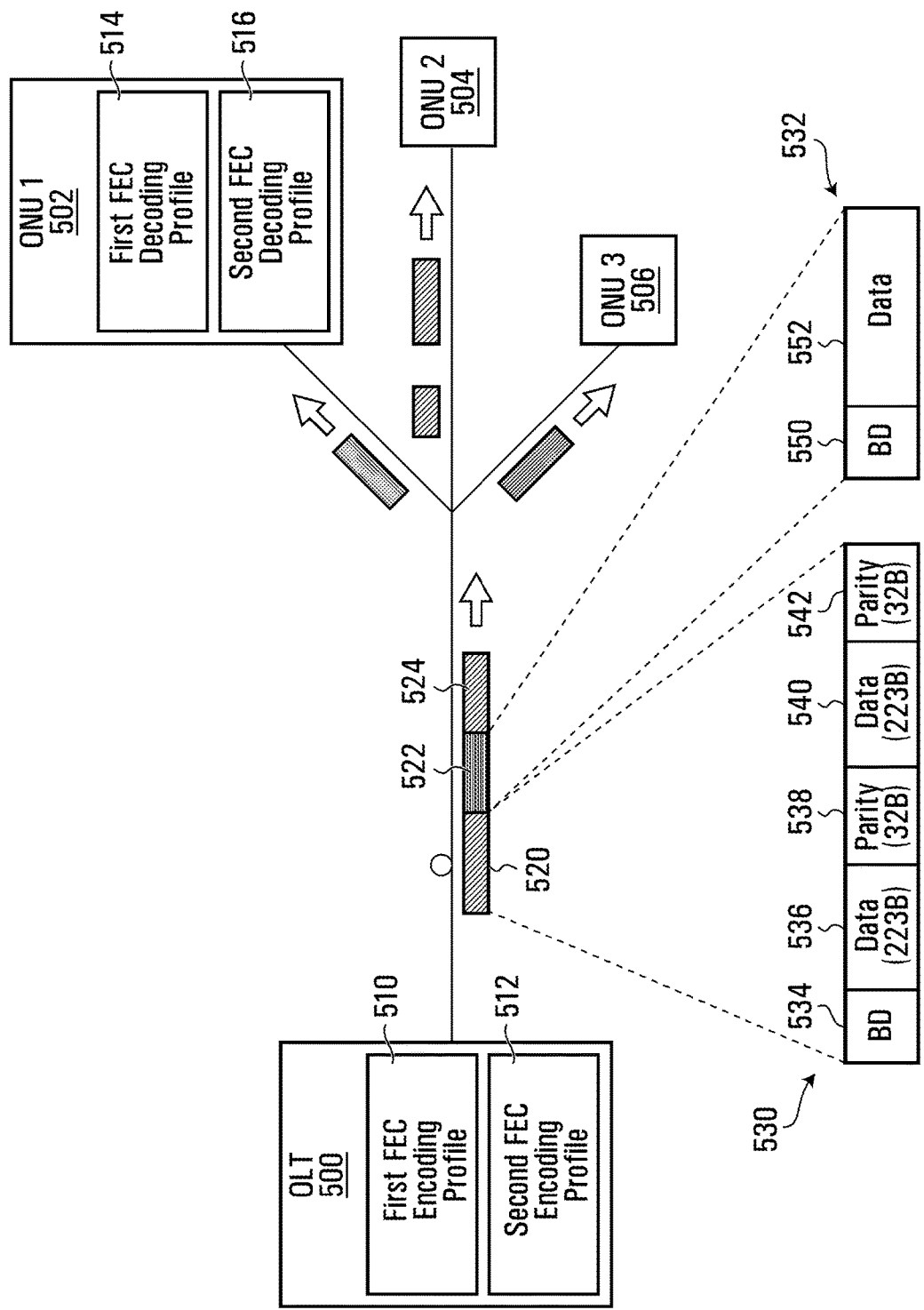
FIG. 5 is a block diagram of a system for transmitting downstream bursts with differing FEC encoding profiles.
Figure 6A:
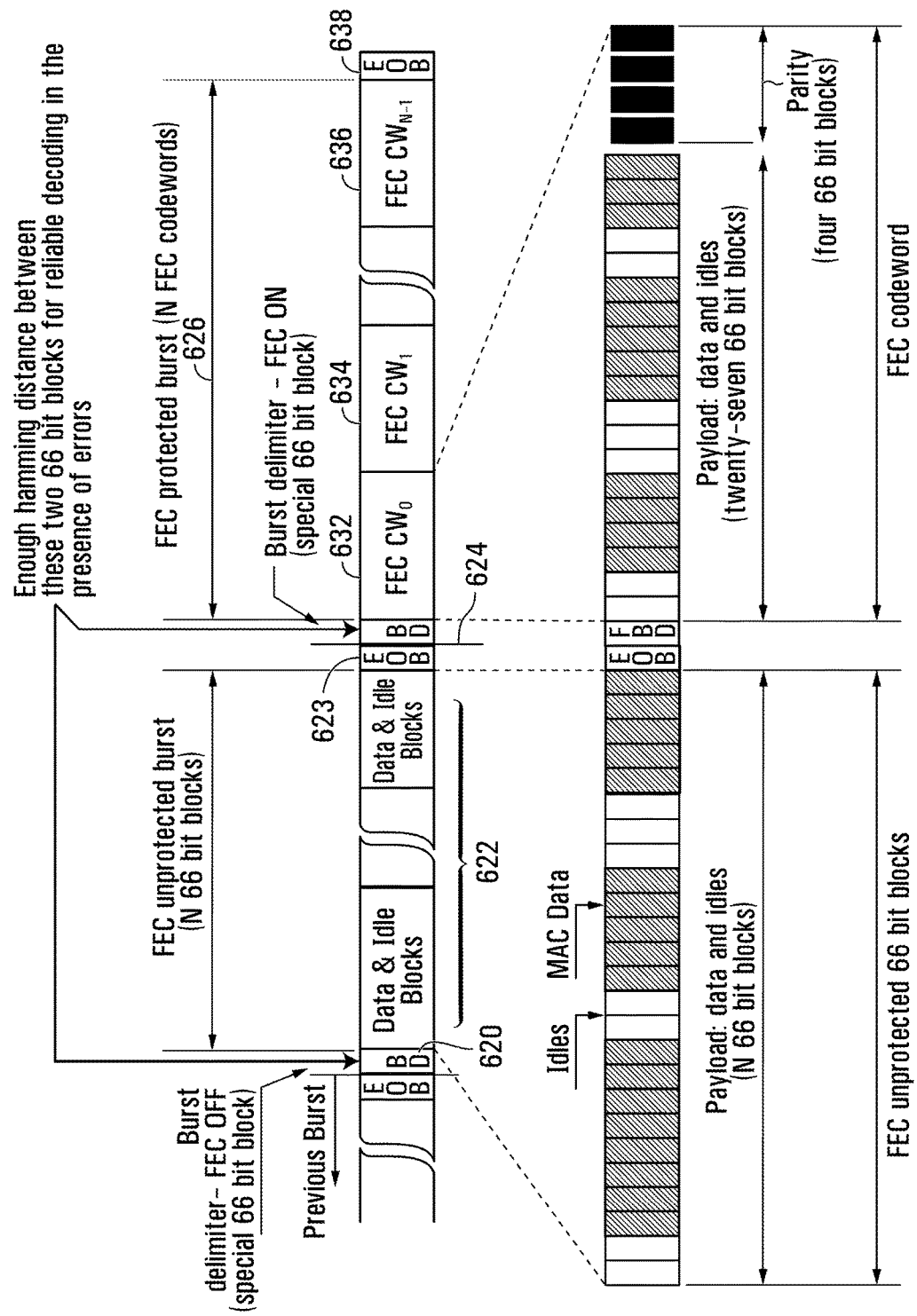
FIG. 6A depicts an example of an FEC unprotected burst and an FEC protected burst.

Referring now to FIG. 5, shown is a block diagram of a system that implements downstream burst transmission with alternative FEC encoding profiles. Shown is an OLT 500 connected in a downstream direction to ONUs 502,504,506. The OLT 500 has a first FEC encoding profile 510 and a second FEC encoding profile 512. Each of the ONUs generally have similar functionality and ONU 502 will be described by way of example. Shown is a first FEC decoding profile 514 and a second FEC decoding profile 516. As before, the two encoding/decoding profiles may involve the use of different FEC encoders/decoders; one of the encoding/decoding profile pairs may involve no FEC encoding/decoding. An example format for a downstream burst for a first FEC encoding profile which is assumed to include FEC encoding is indicated at 530, and an example burst format for a downstream burst for a second FEC encoding profile which is assumed to not include FEC encoding is indicated at 532. Burst 530 includes FEC encoding information in the form of a burst delimiter field 534, data field 536, parity 538, data 540 and parity 542. More generally, there may be any number of data fields with one parity field per data field. Burst 532 includes FEC encoding information in the form of a burst delimiter field 550 followed by data 552. In the example depicted in FIG. 5, three bursts are shown being transmitted in sequence by the OLT 500. The first burst 520 has the first burst format 530; the second burst 522 has the second burst format 532 and the third burst 524 has the first burst format 524. It is possible for a burst to contain data for more than one ONU. The BD field prefixed to each burst is applicable to all ONUs that have data in the burst. While the bursts are being shown conveyed to respective ONUs, in reality, all of the bursts are received by all of the ONUs. FIG. 6A shows a first downstream burst containing unprotected data blocks, and a second downstream burst containing FEC protected codewords. The first burst has a burst delimiter 620 followed by data and idle blocks 622 that are not FEC protected, and an end of burst (EOB) 623. The second downstream burst has a burst delimiter 624 followed by FEC codeword 632,634 . . . 636, and that is followed by an end of burst 638.

The example of FIG. 5, and the specific burst example of FIG. 6A assume that FEC encoding information is transmitted in-band, in the form of the burst delimiter. In other embodiments, the FEC encoding information is transmitted out of band, for example as part of an eOAM or MAC message.

As noted above, in the downstream, the OLT broadcasts data, meaning every burst is seen by all ONUs. Every ONU reads the BD (or FEC encoding information) value of every burst, and decodes the burst using the profile indicated by the BD. Once FEC decoding and error correction if any to bytes that may have been corrupted is done, the ONU extracts any content of the burst that is addressed to that ONU, for example using an LLID (logical link identifier) filtering approach detailed below. The FEC decoder and controlling functions are able to see all the data transmitted by OLT downstream.

Figure 6B:
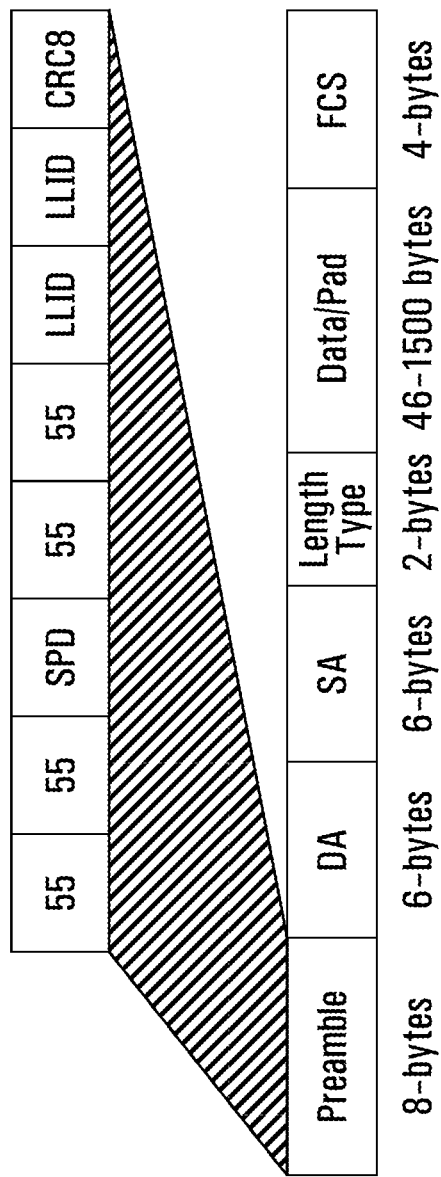
FIG. 6B shows the format of a typical Ethernet frame, including modifications to the preamble field for GEPON, 10GEPON.

In some embodiments, each burst contains one or more Ethernet frames such as shown in FIG. 6B. Each frame has an ONU identifier in the form of a LLID in the preamble. Each ONU knows its own LLID (for example it might be assigned at registration time), and after FEC decoding, accepts only frames that belong to it, and discards others. It is possible that an ONU can have more than one LLID assigned to it in which case the ONU will have a list of all LLIDs assigned to it. The filtering process happens after FEC decoding, and may, for example occur in a reconciliation sublayer (RS) (not shown).

The comments presented above in the discussion of the embodiment of FIG. 2 regarding content of the burst delimiter, implementation of various encoding/decoding profiles, configurations and selection of FEC encoding/decoding profiles apply equally to the embodiment of FIG. 5.

The OLT may decide to use a particular FEC encoding profile, and instruct the ONU to use a corresponding FEC decoding profile. The FEC encoding profile applied to each burst can be selected depending on various parameters such as distance to the ONU, optics quality, operator's choice, desired BER etc. In some embodiments, each ONU monitors downstream performance and provides performance feedback to the OLT for example in the form of a bit error rate. The OLT then uses this feedback to determine which FEC encoding profile to use in the downstream direction.

The following is a specific example of a method of changing the downstream FEC encoding profile:

1. OLT sends downstream profile change command (for example eOAM or MAC Control message) to ONU. This command uses the current profile in use;
2. Pauses the transmission to the affected ONU to allow ONU to process the command (either in hardware or software running on local CPU);
3. Resumes the transmission with new profile. By this time, ONU is ready to decode the bursts with the new profile.

Figure 7A:
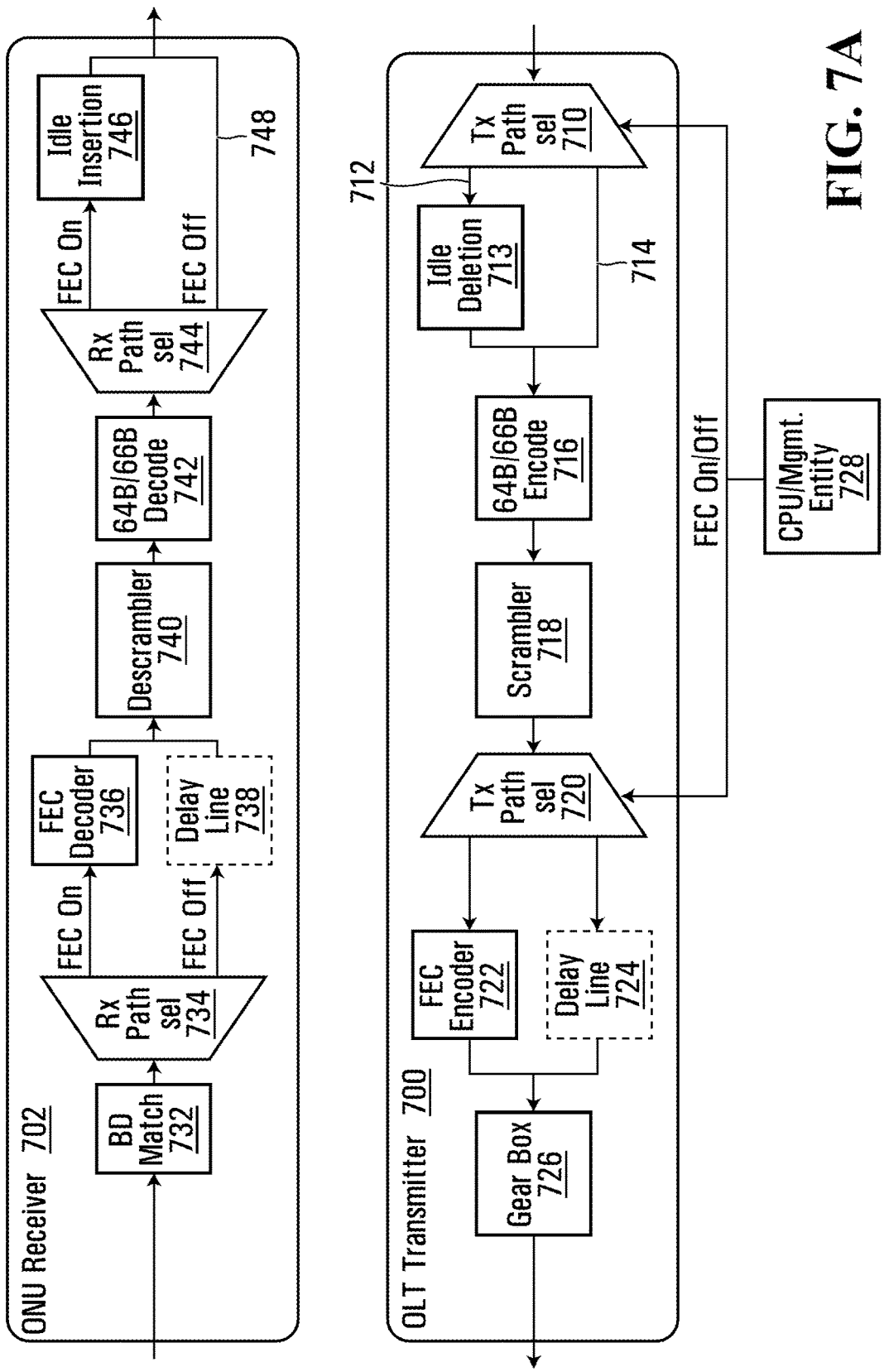
FIG. 7A is a detailed block diagram of an ONU receiver and an OLT transmitter for downstream burst transmission with differing FEC encoding profiles with in-band FEC encoding information transmission.

If the chosen profile is indicated in band, then a shortened pause, or no pause, may suffice. Referring now to FIG. 7A, shown is a block diagram of a system that implements downstream burst transmission with alternative FEC encoding profiles. The system includes an OLT transmitter 700 and an ONU receiver 702. The transmitter 700 includes a CPU/Management entity 728 that controls whether FEC is on or off for a given burst. The CPU/Management entity 728 controls path selection in transmit path selectors 710 and 720. In path selector 710, path 712 is selected when the first FEC encoding profile is active; for this example, this means FEC encoding is to take place, and path 714 is selected when the second FEC encoding profile is active; for this example, this means that FEC encoding is not to take place. Path 712 includes an idle deletion block 713. Following this, a 64 B/66 B encoding is performed at 716 followed by scrambling at 718. Then, transmit path selector 720 passes the output of scrambler 718 to FEC encoder 722 in the first FEC encoding profile is active, or to delay line 724 in the event the second FEC encoding profile is active. The paths then merge again and input to gear box 726 which generates an output of the OLT transmitter 700. The OLT transmitter 700 transmits in accordance with a schedule dictated by the network. The OLT transmitter 700 uses the FEC encoding profile in accordance with instructions from the network. The OLT includes a burst delimiter in each burst that indicates which FEC encoding profile was used.

In some embodiments, there is a scheduler in the OLT that controls downstream scheduling according to various user provisioned SLA (service level agreements). In other embodiments, the actual scheduling is done in other devices upstream of the OLT. In either case, the OLT knows which ONU (or LLID) a given packet is destined to. In some embodiments, the OLT MAC layer determines the LLID value that goes in the preamble field of each Ethernet frame.

Turning now to the ONU receiver 702, this includes a BD match block 732. The BD match block 732 determines which FEC encoding profile was used for the given burst, and accordingly indicates which FEC decoding profile to use in the receiver by examining the burst delimiter. As in other embodiments, other forms of FEC encoding information may alternatively be employed. The output is then passed to the receive path selector 734. If the burst delimiter indicates the first FEC decoding profile is to be used, then the output is passed to FEC decoder 736 whereas if the burst delimiter indicates that the second FEC decoding profile is to be used, then the output is passed to delay line 738. The output of blocks 736 and 738 is passed to the input of descrambler 740. The output of descrambler 740 is passed to the 64 B/66 B decoder 742. Decoder 742 is connected to another receive path selector 744. If the first FEC decoding profile is active, the output is passed to idle insertion block 746 whereas if the second FEC decoding profile is active, the output is passed via path 748 directly to the output.

Figure 7B:
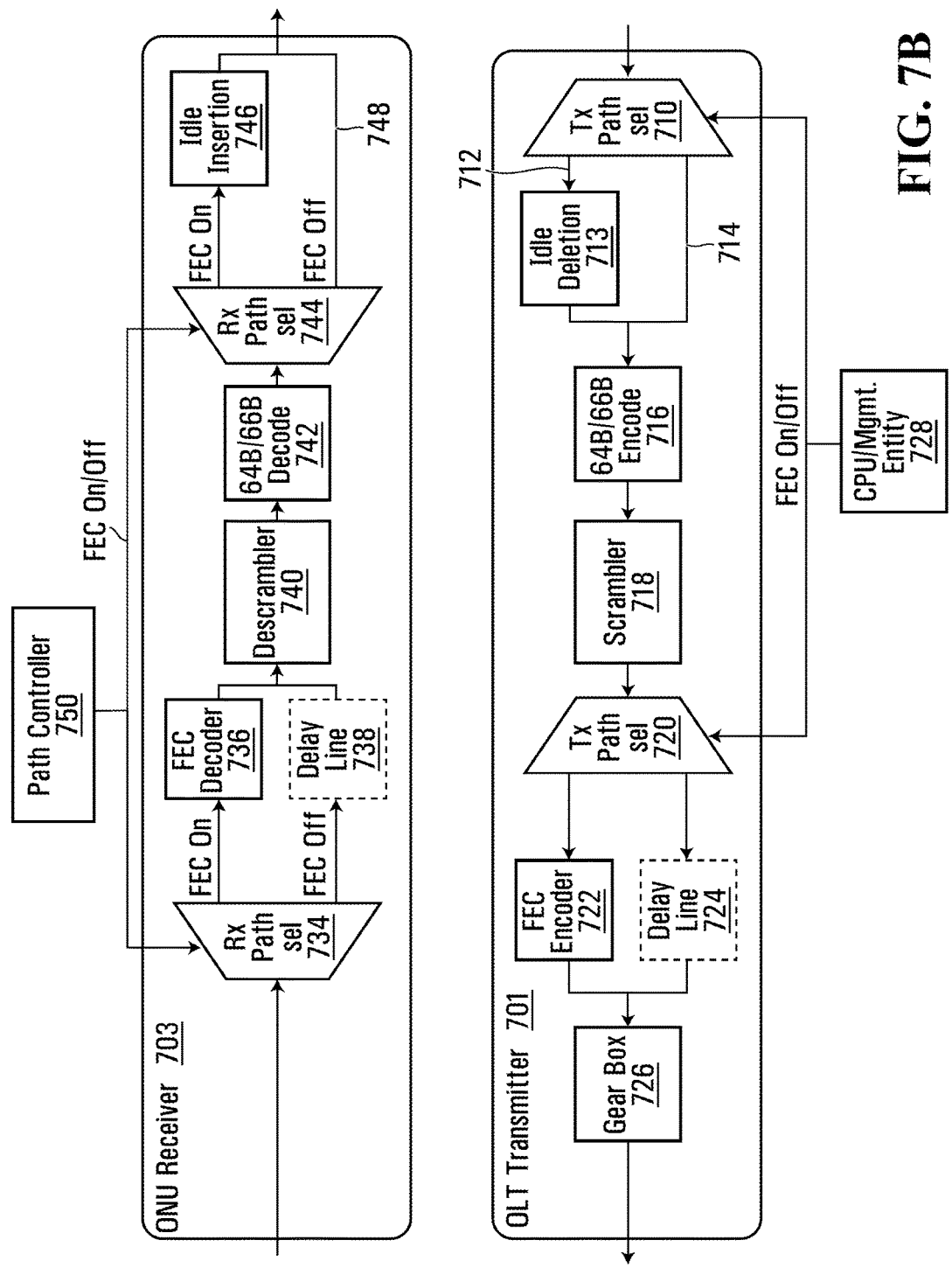
FIG. 7B is a detailed block diagram of an ONU receiver and an OLT transmitter for downstream burst transmission with differing FEC encoding profiles with out of band FEC encoding information transmission.

Referring now to FIG. 7B, shown is another example of an ONU receiver 703 and an OLT transmitter 701. The OLT transmitter 701 is the same as OLT transmitter 700 of FIG. 7A with the exception that the burst generated by the OLT transmitter does not contain a burst delimiter that distinguishes between FEC decoding profiles. Thus, all bursts may for example contain the same burst delimiter. In a specific example, this may be the same as the burst delimiter specified in IEEE Std. 802.3av. The ONU receiver 703 differs from ONU receiver 702 of FIG. 7A in that there is no BD match block 732. In addition, receive path selection in receive path selectors 734 and 746 is controlled by the output of a path controller 750. Path controller 750 may, for example, be implemented as part of an MPCP (multi-point control protocol) engine. The path controller 750 generates FEC on/off controls for the selectors 734, 744 as a function of grant information.

The operation of the embodiment of FIG. 7B is similar to that of FIG. 4B described previously which features the transmission of FEC encoding information out of band.

FIGS. 7A and 7B are very specific examples in which the two encoding/decoding profiles include one with FEC encoding/decoding and one without. Similar functionality can be used to implement a system featuring two or more different FEC encoders. In the illustrated example, path selectors are used to convey bits to the appropriate encoder/decoder. Alternatively, reconfigurable FEC encoders/decoders can be used with inputs that select which FEC encoding/decoding profile to use in which case path selectors are not necessary. The examples of FIGS. 7A and 7B can be expanded to include additional FEC encoding/decoding profiles.

Figure 7C:
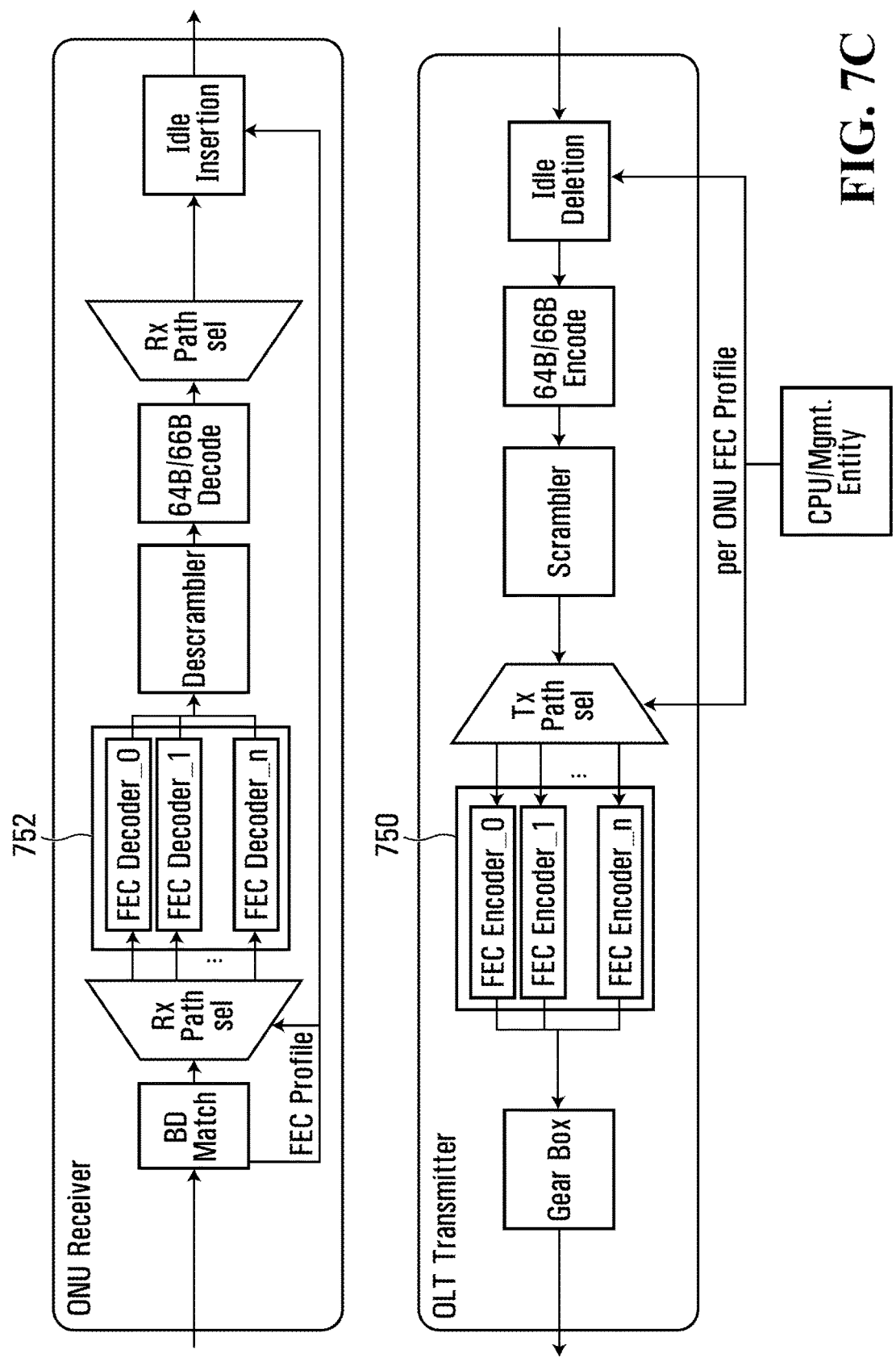
FIG. 7C depicts another detailed example of an OLT transmitter and ONU receiver for transmitting downstream bursts with multiple FEC encoding profiles in which the various FEC encoders and decoders are implemented as logical paths through a single encoder and decoder.

FIG. 7C shows another example where the multiple FEC encoding and decoding profiles are depicted as logical paths through a single FEC encoder 750 and a single FEC decoder 752. A similar approach can be implemented for any of the other upstream and/or downstream embodiments described herein.

It should be understood that a system/method may be implemented in which multiple FEC encoding profiles are implemented only for the upstream. Alternatively, systems and methods may be implemented in which multiple FEC encoding profiles are implemented only for the downstream. Alternatively, multiple FEC encoding profiles which may be the same, or different, may be implemented for both the upstream and the downstream.

Further embodiments provide an ONU in accordance with any of the embodiment described herein or configured to perform a method in accordance with any of the embodiments described herein from the ONU perspective.

Further embodiments provide an OLT configured in accordance with any of the embodiments described herein or to perform a method in accordance with any of the methods described herein from the OLT perspective.

Figure 8:
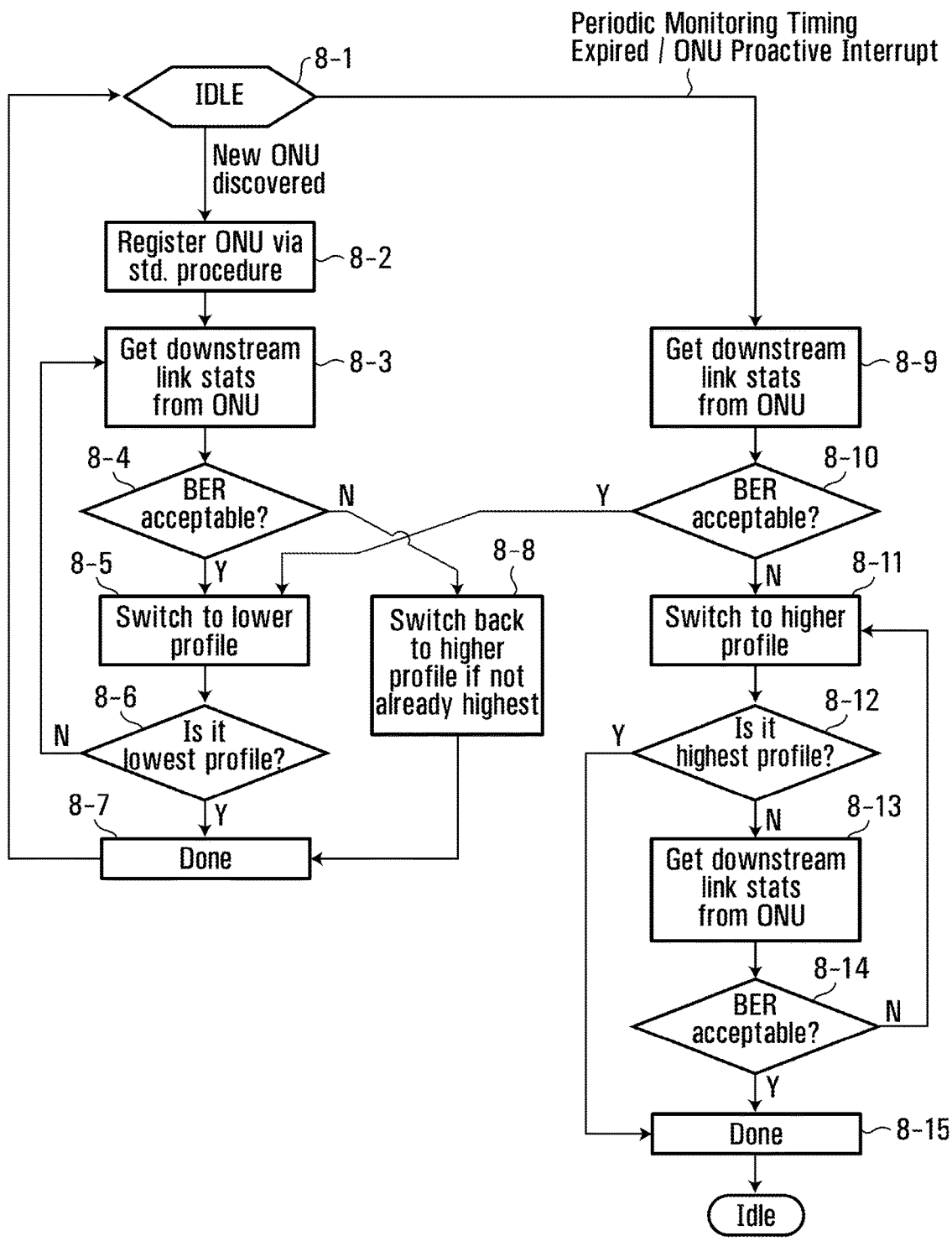
FIG. 8 is a flow chart of a method of setting and maintaining an FEC encoding profile for downstream transmission.

The flowchart of FIG. 8 depicts a possible sequence in which OLT starts with full FEC and slowly dials down or completely turns off FEC for downstream transmission. It also shows periodic monitoring and tuning.

In the left hand side of FIG. 8, shown are the steps for initially setting an FEC encoding profile. Initially, the method is in an idle state 8-1 after which a new ONU is discovered. The new ONU is registered via a standard procedure at block 8-2. At 8-3, downstream link statistics are obtained from the ONU. At block 8-4, if the current BER (bit error rate) is acceptable, then in block 8-5 a switch is made to a lower profile. If the profile to which a switch is made is the lowest profile, then the method is done at block 8-7. Otherwise, the method returns to block 8-3 with obtaining downstream link statistics again. If the BER is unacceptable at block 8-4, then a switch back to the next higher profile is made if not already the highest in block 8-8.

The right hand column of steps in FIG. 8 shows steps for updating the FEC encoding profile at a later time, for example due to periodic monitoring or an ONU proactive interrupt. The method begins at block 8-9 with obtaining downstream link statistic from the ONU. If the BER is acceptable at block 8-10, then the method continues at block 8-5 and then processing continues as before using the steps in the left hand column. This results in the FEC encoding profile being increased to a highest possible level. If the FEC encoding profile is not acceptable at block 8-10, then in block 8-11 a switch to a higher profile is made. If this is the highest profile in block 8-12, then the method is done at block 8-15. If it is not the highest profile, then again downstream link statistics are obtained from the ONU at block 8-13. If the BER is acceptable, then the method is done. If the BER is unacceptable, then the method returns to block 8-11.

Figure 9:
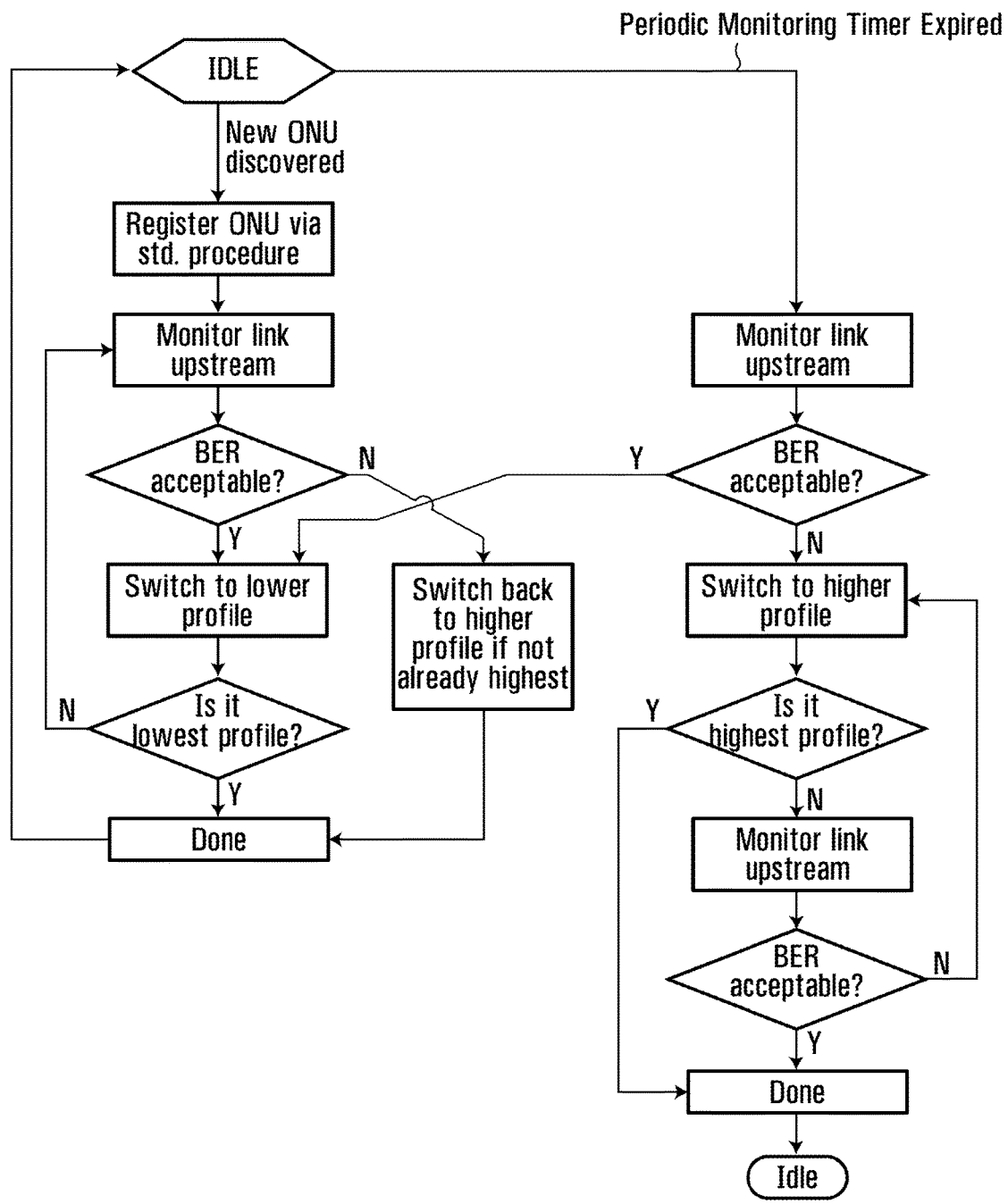
FIG. 9 is a flow chart of a method of setting and maintaining an FEC encoding profile for upstream transmission.

FIG. 9 depicts a similar sequence to that of FIG. 8 for upstream transmission. FIG. 9 is generally the same as FIG. 8 with the exception of the fact that rather than obtaining downstream link statistics from the ONU in blocks 8-3, 8-9, 8-13, the OLT is able to monitor the upstream link directly.

In some embodiments, one or more of the methods described herein are employed for a 10G EPON.

In some embodiments for upstream transmission and/or downstream transmission, FEC encoding information is sent in the form of a burst delimiter. More generally, FEC encoding information can be sent in band, or out of band. Another example of in-band transmission include a new field included as part of each burst, for example inserted either in front or after a BD, but before the payload starts In some embodiments, there is a sync field at the beginning of each upstream burst, and FEC profile information is embedded in the sync field by modifying the sync field. In some embodiments, a sync field may contain many 66 bit blocks, and the length of the sync field is conveyed to the OLT by ONU.

In some embodiments, the ONU powers down some or all of the FEC encoding and/or decoding circuitry when it is not needed. This can be done as a function of the instructed FEC encoding/decoding profiles or separate signaling can be employed. In some embodiments, a high level command is I sent to power back on the FEC encoder and/or decoder with sufficient time to bring up the FEC encoder and/or decoder before the first communication is received or is to be transmitted. In another example, for upstream transmission, in each ONU, FEC encoding is either performed or not. The OLT instructs each ONU whether to perform FEC encoding or not using signaling, for example control channel signaling. Optionally, each ONU also includes FEC encoding information in band that indicates whether FEC encoding was performed or not. In another example, for downstream transmission, for each burst, FEC encoding is either performed or not. A burst may contain content for one or more ONUs. The OLT includes FEC encoding information in band that indicates whether FEC encoding was performed or not. Alternatively, or in addition, the OLT instructs each ONU whether to perform FEC decoding or not using signaling, for example control channel signaling.

In some embodiments, where multiple FEC encoding/decoding profiles are implemented for both upstream and downstream transmission, separate signaling is sent to instruct each ONU which FEC encoding profile to use, and to instruct each ONU which FEC decoding profile to use. In some embodiments, a single instruction is sent to an ONU that instructs the ONU as to which FEC encoding profile to use and which FEC decoding profile to use.

Further embodiments provide a semiconductor device that is configured to implement or control the ONU side functionality of any of the embodiments described or claimed herein.

Further embodiments provide a semiconductor device that is configured to implement or control the OLT side functionality of any of the embodiments described or claimed herein.

In some embodiments, a selection of which encoding profile to use is made based on an optical budget. This can be implemented by a network operator on a per-ONU basis, for example, for the uplink and/or the downlink A specific example of a method that employs optical budget for this purpose will now be described. To begin, an optical budget is determined or otherwise obtained for an ONU. In some embodiments, the optical budget needed can be calculated based on known parameters. For example, the optical budget might be calculated as follows:

Optical budget needed=(fiber length)*(fiber loss/km)+other link loses, where:

other link loses=splice loss*number of splices+connector loss*number of connectors Alternatively, methods exist for measuring needed optical budget. For example, Optical Time Domain Reflectometer (OTDR) is commonly used to determine the fiber length and attenuation due to splice and connectors. This can be used to determine the needed optical budget. The optical budget available for an ONU is defined, for example, as follows, but other methods can be employed:

Optical budget available=minimum transmitter launch power−maximum receiver sensitivity.

This can be determined from parameters of components of the system. For example, the receiver sensitivity is commonly listed in the optical transceiver vendor datasheets.

FEC encoding, when performed, introduces a coding gain. In a specific example, the RS (255,223) FEC code provides a 3 dB gain. In some embodiments, a selection between performing FEC encoding and not is made (i.e. one FEC encoding profile includes performing FEC encoding, while another does not). In this case, when the available optical budget exceeds the optical budget needed, the FEC encoding can be switched off, for example by bypassing the FEC encoder. When the available optical budget does not exceed the optical budget needed, FEC encoding is employed to make up the difference.

In some embodiments, there are only two FEC encoding profiles; one includes FEC encoding, and one does not. When the available optical budget does not exceed the optical budget needed, the FEC encoding profile with FEC encoding is used, whereas when the available budget does exceed the optical budget needed the FEC encoding profile with no FEC encoding is used.

In some embodiments, there are at least two FEC encoding profiles that include different FEC encoding strengths, and there may also be an FEC encoding profile with no FEC encoding. In this case, a selection of which encoding profile can be made based on how much the optical budget needed exceeds the optical budget available. This amount is made up for using a selected FEC encoding profile, for example one selected to provides the least gain necessary to make up the difference. Specifically, an FEC encoding profile can be selected such that the available optical budget+FEC encoding gain exceeds the needed budget by a minimum amount possible for the set of available FEC encoding profiles.

Figure 10:
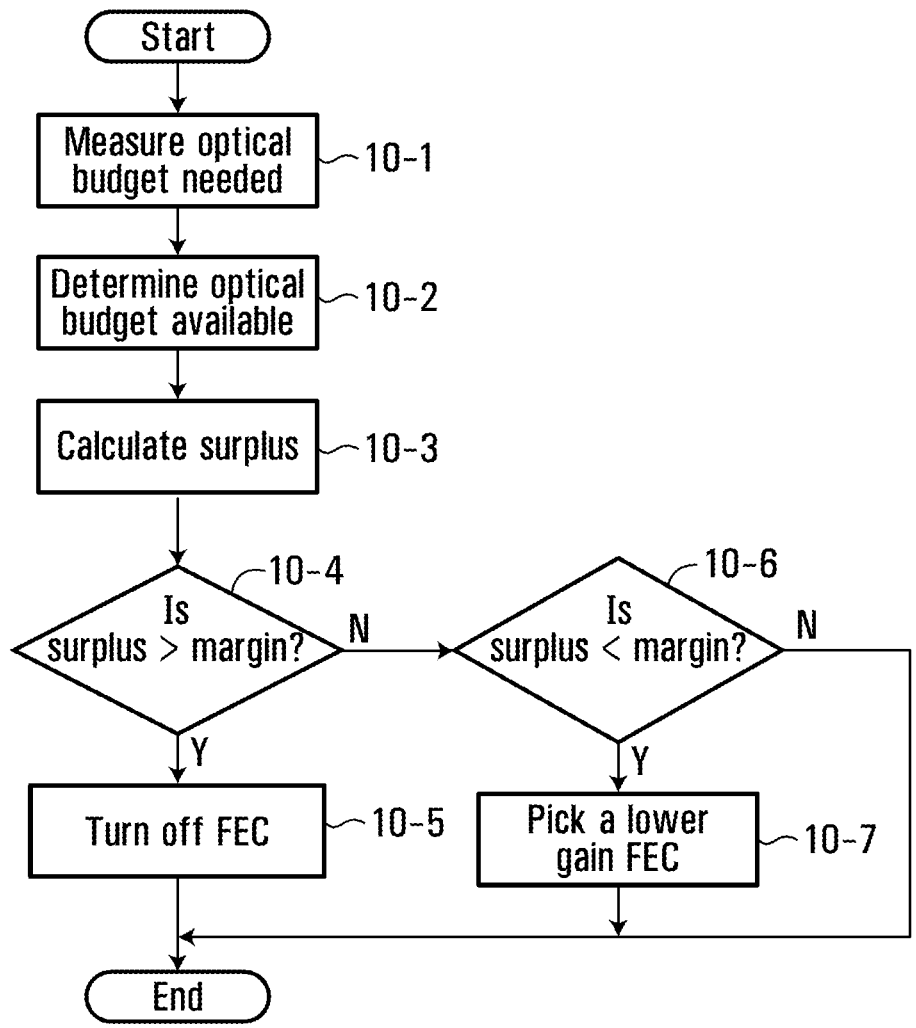
FIG. 10 is a flowchart of a method of setting an FEC encoding profile for an ONU based on optical budget.

Referring now to FIG. 10 shown is a flowchart of a method based on the above-described example. This method is performed on a per-ONU basis to select an FEC encoding profile for a given ONU. Any of the previously described embodiments can be used to perform the actual encoding/transmission/reception. In block 10-1, the optical budget needed is obtained. This can be measured, calculated, or looked up, for example. In block 10-2, the optical budget available is determined. This can be calculated or looked up, for example. The surplus is determined in block 10-3 based on the optical budget needed and the optical budget available. If the surplus is greater than 0 (or greater than a margin) (yes path block 10-6) then the FEC encoder is turned off at block 10-7. If not (no path block 10-6) then there is a deficit, an encoding profile with FEC encoding is enabled or turned on (block 10-7). Where there are multiple such encoding profiles, the encoding profile with the least FEC coding gain that makes up the deficit.

The above approach can be implemented off-line to determine FEC encoding profiles to use during network configuration. Alternatively, it can be implemented during network deployment or after the network is live. Numerous modifications and variations of the present disclosure are possible in light of the above teachings. It is therefore to be understood that within the scope of the appended claims, the disclosure may be practiced otherwise than as specifically described herein.

We claim:

1. An optical network comprising:
   an OLT (optical line terminal), the OLT configured to implement at least two encoding profiles comprising a first FEC (forward error correction) encoding profile that comprises FEC encoding, and a second FEC encoding profile that comprises FEC encoding with a weaker encoding than the first FEC encoding profile or that performs no FEC encoding;
   at least two ONUs (optical network units), each ONU configured to implement at least two decoding profiles comprising a first FEC decoding profile corresponding to the first FEC encoding profile, and a second FEC decoding profile corresponding to the second FEC encoding profile;
   the OLT is configured to transmit FEC encoding information that indicates which downstream burst(s) are to be encoded using which FEC encoding profile, wherein the OLT transmits the FEC encoding information in-band as part of each burst by transmitting a respective burst delimiter field forming part of each burst, wherein different burst delimiter values are transmitted to indicate which FEC encoding profile is used, and wherein each of the different burst delimiter values are installed at each ONU during initial configuration;
   the OLT configured to transmit a plurality of downstream bursts, each downstream burst comprising content for at least one ONU of the at least two ONUs, wherein each downstream burst is transmitted using one of the FEC encoding profiles consistent with the transmitted FEC encoding information;
   each ONU is configured to receive the plurality of downstream bursts by receiving each burst using the decoding profile indicated by the FEC encoding information.

2. The network of claim 1 wherein:
   the first FEC encoding profile comprises FEC encoding, and the first FEC decoding profile comprises FEC decoding; and
   the second FEC encoding profile comprises no FEC encoding and the second FEC decoding profile comprises no FEC decoding.

3. The optical network of claim 2 wherein:
   each burst transmitted using the second encoding profile comprises:
      the burst delimiter indicating the burst to be transmitted using the second FEC encoding profile;
      a payload comprising a plurality of blocks each of which is an idle block or a data block;
      an end of burst delimiter; and
   each burst transmitted using the first encoding profile comprises:
      the burst delimiter indicating the burst to be transmitted using the first FEC encoding profile;
      at least one FEC codeword, each FEC codeword comprising a payload and parity, the payload comprising a plurality of blocks each of which is an idle block or a data block, and parity;
      an end of burst delimiter.

4. The network of claim 1 wherein: the first FEC encoding profile comprises a first FEC encoder, and the second FEC encoding profile comprises a second FEC encoder with a weaker coding than that of the first FEC encoder; the first FEC decoding profile comprises a first FEC decoder corresponding to the first FEC encoder, and the second FEC decoding profile comprises a second FEC decoder corresponding to the second FEC encoder.

5. The network of claim 1 wherein the FEC encoding information is sent in control packets.

6. The network of claim 1 wherein an iterative method is used to set a respective FEC encoding profile and FEC decoding profile for each ONU.

7. The network of claim 1 further comprising:
   for each ONU, monitoring performance of upstream communications from the ONU;
   selecting or updating or selecting and updating the FEC encoding profile and FEC decoding profile used for the ONU as a function of the performance.

8. The optical network of claim 1 wherein the different burst delimiter values are installed by the OLT upon discovery of each ONU.

9. An OLT (optical line terminal) comprising:
   FEC (forward error correction) decoding circuitry configured to implement at least two decoding profiles comprising a first FEC decoding profile and a second FEC decoding profile, wherein the second FEC decoding profile contains FEC decoding of a code weaker than a code decoded by the first FEC decoding profile;
   the OLT is configured to transmit FEC encoding information that indicates which upstream burst(s) are to be encoded using which encoding profile among a plurality of FEC encoding profiles, wherein the OLT receives FEC encoding information in-band that indicates which FEC decoding profile to use for each burst by receiving a respective burst delimiter field forming part of each burst, wherein different burst delimiter values are transmitted to indicate which FEC encoding profile is used, and wherein each of the different burst delimiter values are installed at each optical network unit (ONU) during initial configuration;

the OLT is configured to receive the plurality of upstream bursts by receiving each burst using one of the FEC decoding profiles consistent with the transmitted FEC encoding information.

10. The OLT of claim 9 wherein the transmitted FEC encoding information is sent in control packets.

11. The OLT of claim 9 wherein:
the first FEC decoding profile comprises an idle insertion element that inserts idles to a signal being processed using the first FEC decoding profile;
the second FEC decoding profile comprises at least one delay element that delays a signal being processed using the second FEC decoding profile by an amount substantially equal to a delay introduced by the first decoding profile relative to the second decoding profile.

12. The OLT of claim 9 further configured to receive signaling from a management entity, wherein the signaling is separate from the upstream bursts, and the signaling indicates which FEC decoding profile should be used to receive each upstream burst.

13. An optical network unit (ONU) comprising:
an FEC (forward error correction) encoder;
the ONU is configured to receive FEC encoding information that indicates whether to use the FEC encoder or not for upstream burst transmission and to transmit a plurality of upstream bursts, wherein each upstream burst is transmitted using one of a plurality of encoding profiles as indicated by the FEC encoding information, wherein the ONU transmits FEC encoding information in-band that indicates whether FEC encoding is being performed or not by transmitting a respective burst delimiter field forming part of each burst, wherein different burst delimiter values indicate which FEC encoding profile is used, and wherein each of the different burst delimiter values are installed at the ONU during initial configuration.

14. The ONU of claim 13 wherein the ONU is configured to power down at least part of FEC encoding circuitry when no FEC encoding is to be performed.

15. The ONU of claim 13 wherein the received FEC encoding information is received in control packets.

16. The ONU of claim 13 further comprising:
an idle deletion element that deletes idles from a signal being processed using the FEC encoder;
at least one delay element that delays a signal being processed without using the FEC encoder by an amount substantially equal to a delay introduced by the FEC encoder.

17. An integrated circuit comprising:
FEC (forward error correction) decoding circuitry configured to implement at least two decoding profiles comprising a first FEC decoding profile and a second FEC decoding profile, wherein the second FEC decoding profile either contains no FEC decoding or contains FEC decoding of a code weaker than a code decoded by the first FEC decoding profile;

wherein the integrated circuit is configured to receive FEC encoding information that indicates which downstream burst(s) are to be encoded using which encoding profile;

the integrated circuit is configured to process a plurality of downstream bursts by processing each burst using the decoding profile indicated by the FEC encoding information; wherein the integrated circuit receives the FEC encoding information in-band as part of each burst by receiving a respective burst delimiter field forming part of each burst, wherein different burst delimiter values are installed at the integrated circuit during initial configuration; and FEC encoding circuitry configured to implement at least two encoding profiles comprising a first FEC encoding profile that comprises FEC encoding, and a second FEC encoding profile that comprises FEC encoding with a weaker encoding than the first FEC encoding profile or that performs no FEC encoding;

wherein the integrated circuit is configured to receive FEC encoding information that indicates which encoding profile to use for upstream burst transmission and to generate a plurality of upstream bursts, wherein each upstream burst is generated using one of the encoding profiles as indicated by the FEC encoding information.

18. An ONU (optical network unit) comprising:
a FEC (forward error correction) decoder;
FEC encoding information receiving circuit for receiving FEC encoding information that indicates whether to apply FEC decoding to downstream burst(s) and which one of a plurality of FEC decoding profiles to apply, wherein the FEC encoding information receiving circuit receives the FEC encoding information in-band as part of each burst by receiving a respective burst delimiter field forming part of each burst, wherein different burst delimiter values indicate which FEC encoding profile is used, and wherein each of the different burst delimiter values are installed at the ONU during initial configuration;

downstream burst reception circuit for receiving downstream bursts;

wherein the FEC decoder decodes each received downstream burst or not in accordance with the FEC encoding information.

19. The ONU of claim 18 further comprising:
an idle insertion circuit that inserts idles in a signal being processed using the FEC decoder;
at least one delay circuit that delays a signal being processed without using the FEC decoder by an amount substantially equal to a delay introduced by the FEC decoder.

* * * * *